July 9, 1946.  W. K. KEARSLEY  2,403,803
ELECTRIC BLANKET
Filed Sept. 21, 1944
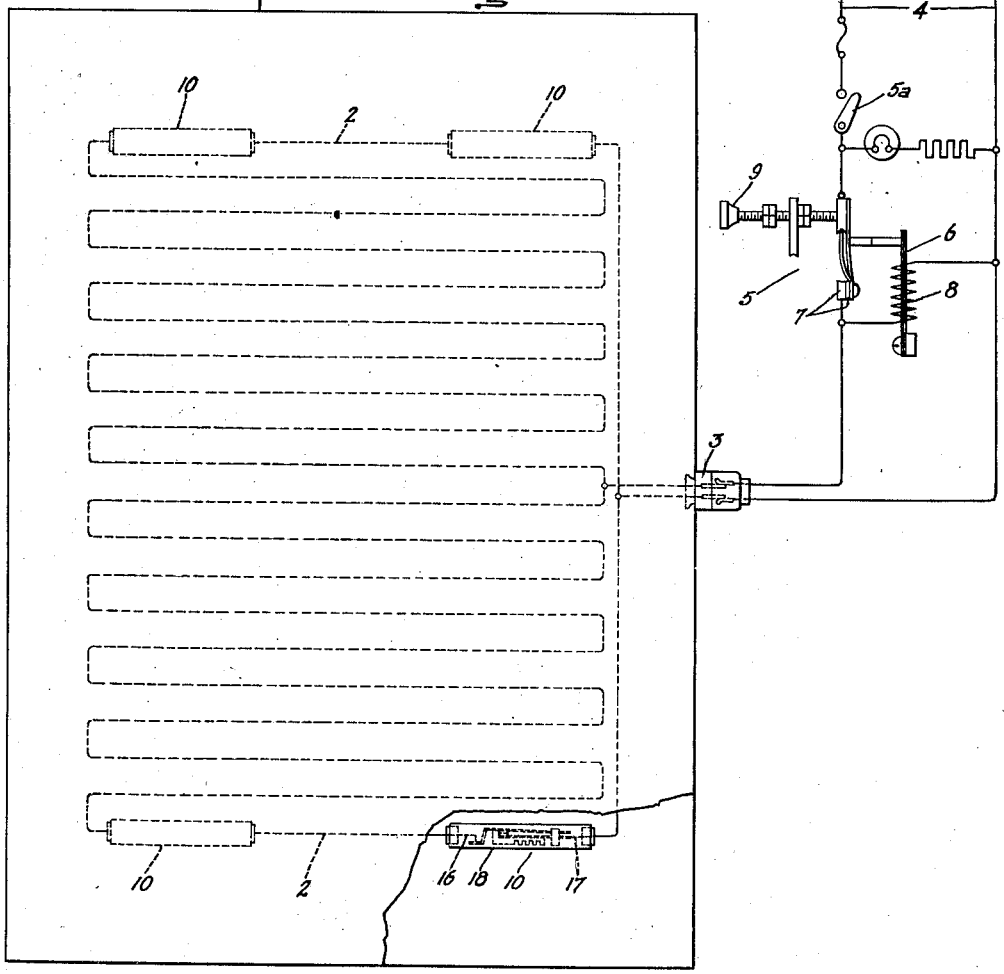
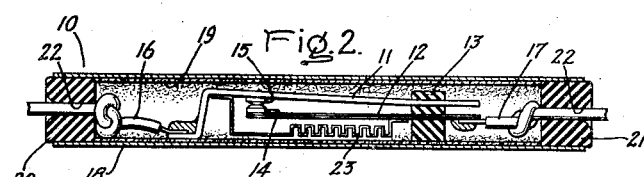
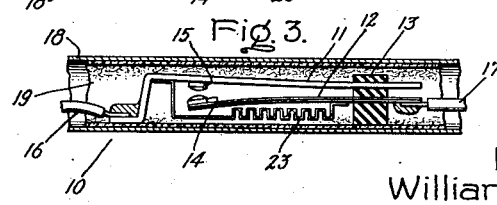
Inventor:
William K. Kearsley,
by Harry E. Dunham
His Attorney.

Patented July 9, 1946

2,403,803

UNITED STATES PATENT OFFICE 2,403,803

ELECTRIC BLANKET

William K. Kearsley, Schenectady, N. Y., assignor to General Electric Company, a corporation of New York Application September 21, 1944, Serial No. 555,067

1 Claim. (Cl. 219—46)

This invention relates to electrically-heated blankets, more particularly to a protective system for such electrically-heated devices, and it has for its object the provision of an improved system of this character.

Electrically-heated blankets or bed covers comprise a blanket having channels in the body thereof, through which channels is threaded an electric heating conductor. This conductor is energized from a suitable source of supply and generates sufficient heat to keep the blanket at some desired temperature under normal conditions of operation during which the blanket is spread out over the bed. It occasionally happens that during use the blanket becomes bunched or folded, or after use is rolled up at the bottom of the bed while still energized. Under such conditions the heat lost from the folded or rolled section of the heating conductor is greatly reduced, and this tends to cause localized heating with the attendant possibility of fire. In order to preclude the possibility of such local overheating, there have been incorporated in the body of the blanket a number of protective enclosed thermostats which are suitably placed in different areas and connected so that over-heating in any one of these areas causes the associated thermostat to operate to open the heating circuit and thereby deenergize the blanket.

In some cases, difficulty has been encountered with enclosed thermostats of conventional construction because the thermostats tend to cycle; that is, after the thermostat opens the blanket circuit in response to an abnormal high temperature, and as a result thereof the blanket cools, the thermostat will reclose and heat up the blanket again. This recycling causes arcing and pitting of the contacts and at times destroys the thermostat in such a fashion that it remains permanently open. Also the arcing at times heats the safety thermostat and causes rapid recycling with the result that in effect the safety thermostat takes the control over away from the blanket temperature control device. As a result the blanket will open at a very low temperature.

In accordance with this invention in one form thereof, a suitable auxiliary heating resistance is placed in thermal relation with the thermostat. This heating resistance is controlled by the thermostat so that when the thermostat is closed and the blanket energized the auxiliary heating resistance is not connected in the blanket circuit, but when the thermostat opens due to over-heating by the blanket, the auxiliary heater is connected in the blanket circuit. The auxiliary heater when energized is arranged to perform two functions: one—to apply localized heat to the thermostat to hold it continuously in its open position as long as the blanket is energized from the supply source; and two—to cut down the current in the blanket circuit to a very small fraction of its normal value whereby the blanket cools down far below the danger point. In order to restore normal operation of the blanket, it is necessary that it be disconnected from the supply source for an appreciable period of time in order to allow the thermostatic switch to cool and reclose for normal blanket operation.

For a more complete understanding of this invention, reference should be had to the accompanying drawing, in which Fig. 1 illustrates an electric blanket provided with a protective device embodying this invention; Fig. 2 is a sectional view taken through the protective device embodying this invention; and Fig. 3 is a view similar to Fig. 2 but illustrating the protective device in a different operative condition.

Referring to the drawing, I have shown my invention as applied to an electric blanket or bed cover 1 having enclosed therein suitable electric heating conductors 2 formed into a series of convolutions, and which may be connected, as shown, to form two parallel circuits. The blanket has a suitable attachment plug 3 which may be connected to a suitable source of electrical supply 4 through a control device 5 which controls the energization of the heating conductors 2. A manually operable switch 5a is inserted in the system between the control device 5 and the supply source 4.

Preferably, the control device 5 will be constructed and arranged as is the control device described in my United States Patent No. 2,195,958, dated April 2, 1940, and the blanket will be controlled as therein described and claimed.

Briefly, this control device comprises a bimetallic thermostatic bar 6 for operating switch contacts 7 that are connected in series with the blanket circuit, as shown. As pointed out in detail in my aforementioned patent, this thermostatic element 6 is located to respond to the temperature of the room in which the blanket is being used. In addition to this, the thermostatic bar is caused to respond to a local heat source which is obtained by winding the thermostat bar with an auxiliary electric heating conductor 8. One end of this conductor, as shown, is connected to the right-hand conductor of the supply source 4, while the other end is connected to the other conductor of the supply source 4 through the switch contacts 7. In view of this arrangement when the contacts are closed to energize the electric blanket circuits 2, the heater 8 is energized to apply heat to the thermostat 6, whereas when the switch contacts 7 open both the blanket circuits and the heater 8 are deenergized. The electrical energy input to the blanket is controlled by the proportion of time that the contacts 7 are closed to the time that they are open. These times are controlled by the temperature of the thermostat bar 6 which is jointly dependent upon the operation of the auxiliary heater 8 and the temperature of the air in the room. The heat applied by the auxiliary heater 8 to the thermostat is delivered at a constant rate whereas that supplied by the room may be variable, depending upon whether or not the room temperature remains constant or varies. Therefore, if the room temperature remains constant the amount of energy delivered to the blanket is constant and the temperature of the blanket remains constant. However, if the room temperature varies, the blanket temperature will vary because it will require more or less time for the heater 8 to heat the thermostat sufficiently to open the contacts 7—depending upon whether the air temperature falls or rises. A suitable adjustment screw 9 is provided for adjusting the setting of the thermostatically controlled switch 5 in order to vary the temperature held in the blanket, all as fully described in my above-mentioned patent.

For the purpose of preventing local overheating in case the blanket should become folded or bunched while connected to the supply source 4, I provide a plurality of protective thermostat devices 10 which are connected in series with the heating conductors 2 and which are placed within the blanket in heat-conducting relation therewith so as to operate in response to an overtemperature substantially to deenergize the associated portion of the heating circuit. While I have shown the blanket as being provided with four protective devices 10, it will be understood that any number may be used depending upon the degree of protection desired.

Referring more particularly to Figs. 2 and 3, the safety device 10 comprises a metal conducting arm 11 and a bimetallic thermostatic strip 12 which extend in parallel spaced relation and which are anchored in a block 13 formed of an electrical insulating material. The bimetallic strip 12 carries at its free end a contact 14 which cooperates with a contact 15 mounted on the conducting support 11, as shown. A suitable flexible electrical conductor 16 is connected to the conducting arm 11 and a similar conductor 17 is connected to the fixed end of the bimetallic thermostat bar 12, as shown. These conductors are connected in series circuit relation with the conductors 2 of the blanket, as more clearly shown in Fig. 1.

The control device 10 further is provided with a fluid-tight enclosing casing 18 in the form of a tube which is formed of a good heat-conducting material, such as copper. The tube has an inner lining 19 of some suitable insulating material, such as asbestos, in order to electrically insulate the tube from the thermostatic switch assembly. The ends of the tube are closed by means of plugs 20 and 21 which are formed of some suitable resilient material, such as rubber, so that they may be inserted in the ends of the tube. The end plugs are provided with axially-extending openings 22 through which the conductors 16 and 17 pass to the exterior of the casing.

The protective device 10 also comprises a heating resistance element 23 located within the casing 18 in thermal relation with the thermostatic element 12. In the specific example of the invention illustrated, this conductor is located below the thermostatic element, as viewed in the various figures of the drawing. It will be understood, however, that it may be wound upon the thermal blade 12, if this construction be preferred.

Also, it will be observed that one end of the resistance conductor 23 is attached to the bimetal element 12 adjacent its fixed end, while the other end is attached to the conducting bar 11 at a point to the left of the switch contacts 14 and 15, as viewed in the drawing. Thus, it will be observed that the auxiliary resistance heater 23 is so controlled by the contacts 14 and 15 that when they are closed, as shown in Figs. 1 and 2, the heater 23 will be shorted out of the blanket heating circuit, the current at that time flowing through the bimetal blade 12, but when the contacts 14 and 15 are opened, as shown in Fig. 3, the resistance 23 will be connected in series with the blanket circuit. The resistance heater 23 has such a resistance that when the thermostat 12 opens to energize it, as shown in Fig. 3, it will supply sufficient localized heat to the thermostatic bar 12 to hold the bar in its open contact position shown in Fig. 3 as long as the blanket 1 be energized from the supply source 4 through the control device 5. Furthermore, it will have such a resistance that it will reduce the current flow in the blanket circuit 2 in which the associated control device 10 is connected to but a very small fraction of the normal current, and thus will protect the blanket against an excessively high temperature condition. For example, for a blanket having a wattage of 180 watts, the auxiliary heater 23 will have a wattage of one or two watts. It will be understood that a heater of such small wattage will not itself generate enough heat to become a source of danger.

In the operation of the blanket, it will be understood that when the blanket is "plugged in" to the supply source 4 and the switch 5a closed, its temperature will normally be under the control of the control element 5. However, should the blanket be folded up or a portion thereof be folded up so that the temperature in the blanket or a part thereof tends to rise excessively, one or more of the safety devices 10 will respond to this increased temperature in the sense that the temperature of the thermostatic element 12 will increase. Should the temperature of this element 12 increase to its operating temperature, which will be materially above the highest normal operating temperature, but below a dangerously high value which might char the blanket or set it on fire, the element will open the contacts 14 and 15 and thereby connect the auxiliary heater 23 in the blanket circuit in order to energize this heater to keep the thermostatic switch open and in order to reduce the blanket current to a safe value, all in the manner previously described.

It will be observed that since the resistance heater 23 holds the thermostatic switch over after it has operated to its open position in response to an abnormal temperature rise, that the switch cannot possibly recycle. This prevents repeated arcing at the contacts and therefore prevents the burning and pitting of the contacts—and greatly increases their life. In preventing the recycling of the thermostatic switches, periodical reenergization of the blanket circuit is obviated, and therefore the temperature of the blanket will be materially lower than were such recycling permitted.

While I have shown a particular embodiment of my invention, it will be understood, of course, that I do not wish to be limited thereto since modifications may be made, and I, therefore, contemplate by the appended claim to cover any such modifications as fall within the true spirit and scope of my invention.

What I claim as new and desire to secure by Letters Patent of the United States is:

In an electric blanket, a heating circuit in the blanket, temperature responsive means normally controlling the energy input to said heating circuit in response to variations in air temperature of the bedroom in which the blanket is placed so that a substantially uniform temperature is held in said blanket irrespective of said variations in air temperature, and safety means for preventing the occurrence of an abnormally high and dangerous temperature condition in a section of said blanket comprising a thermostatic switch located in said blanket in heat conducting relation with said section and connected in said heating circuit, said switch normally being closed to complete said heating circuit through said section when the temperature in said section is a normal one obtained by the operation of said temperature responsive means, and said switch operating to open in response to an over-heating temperature in said section, a local resistance heater in thermal relation with said thermostatic switch controlled thereby so as to be deenergized when the switch is closed and so as to be connected in said heating circuit when said switch opens responsively to said over-heating temperature whereby it is energized and applies localized heat to said thermostatic switch to maintain it open, and said resistance heater having such resistance that when it is connected in said heating circuit it cuts down the energy input thereto materially below that normally supplied when under the control of said temperature responsive means thereby protecting the blanket against an excessively high temperature condition and further having such resistance that it itself will not generate sufficiently high local heat to heat the adjacent sections of said blanket to an excessively high temperature.

WILLIAM K. KEARSLEY.